(12) United States Patent
Staughton

(10) Patent No.: US 10,551,116 B2
(45) Date of Patent: Feb. 4, 2020

(54) VERTICAL PLATE FREEZER SYSTEM

(71) Applicant: COOL OFF PTY LTD, Howlong, NSW (AU)

(72) Inventor: Simon Staughton, Howlong (AU)

(73) Assignee: COOL OFF PTY LTD, Howlong (AU)

( * ) Notice: Subject to any disclaimer, the term of this patent is extended or adjusted under 35 U.S.C. 154(b) by 179 days.

(21) Appl. No.: 15/752,020

(22) PCT Filed: Aug. 15, 2016

(86) PCT No.: PCT/AU2016/000280
§ 371 (c)(1),
(2) Date: Feb. 12, 2018

(87) PCT Pub. No.: WO2017/024339
PCT Pub. Date: Feb. 16, 2017

(65) Prior Publication Data
US 2018/0238615 A1 Aug. 23, 2018

(30) Foreign Application Priority Data

Aug. 13, 2015 (AU) .................................. 2015903257

(51) Int. Cl.
*F25D 25/04* (2006.01)
*F25D 31/00* (2006.01)
*A23L 3/36* (2006.01)

(52) U.S. Cl.
CPC ............ *F25D 31/001* (2013.01); *A23L 3/362* (2013.01); *A23L 3/364* (2013.01); *F25D 25/04* (2013.01); *F25D 2400/22* (2013.01)

(58) Field of Classification Search
CPC . A23L 3/36; A23L 3/362; A23L 3/364; F25D 2400/22; F25D 25/04; F25D 31/001
See application file for complete search history.

(56) References Cited

U.S. PATENT DOCUMENTS 4,143,758 A * 3/1979 Gram ................... B65G 57/306
198/624
4,196,802 A * 4/1980 Lorentzen ............. F25D 13/067
198/465.3

(Continued)

FOREIGN PATENT DOCUMENTS

DE 1601890 A1 1/1971
EP 1486746 A1 12/2004

OTHER PUBLICATIONS

International Search Report & Written Opinion issued in PCT/AU2016/000280, dated Dec. 2, 2016.

*Primary Examiner* — Filip Zec
(74) *Attorney, Agent, or Firm* — Roberts Mlotkowski Safran Cole & Calderon

(57) ABSTRACT

There is disclosed a plate freezer apparatus. The plate freezer apparatus comprises a first frame member configured to support a plurality of vertically disposed freezing plate members arranged to define a freezing cavity therebetween and a flooring system configured to extend below the freezing plate members to form a base for the freezing cavities, wherein the flooring system is configured to be raised so as to lift any frozen material present in freezing cavities out of the freezing cavities so that the frozen material extends from the freezing cavities to project above an upper edge of the freezing plate members. A second frame member is mounted above said first frame member so as to extend substantially a length of the first frame member, the second frame member having a plurality of paddle members mounted therein that are individually actuable to extend between a horizontal axis where the paddle members extend substantially parallel with the second frame member, and a vertical axis where the paddle members extend from the second frame member to be received between the frozen material raised from the freezing cavities. The first frame (Continued)

member further comprises a lifting mechanism adjacent a proximal end thereof, the lifting mechanism being actuable to raise the proximal end of the first frame member so as to tilt the first frame member towards a distal end and wherein the paddle members are actuable to facilitate controlled release of the frozen material such that upon release the frozen material is able to slide along the upper edges of the plates and off the distal end of the first frame member for collection.

14 Claims, 12 Drawing Sheets

(56) References Cited

U.S. PATENT DOCUMENTS

| | | |
|---|---|---|
| 4,342,205 A | 8/1982 | Gram |
| 8,813,508 B2 * | 8/2014 | Burn ........................ A23L 3/362 |
| | | 62/345 |
| 2003/0033828 A1 * | 2/2003 | Hensford ................ A23L 3/362 |
| | | 62/345 |

* cited by examiner

VERTICAL PLATE FREEZER SYSTEM

RELATED APPLICATIONS

This application claims priority from the Applicant's earlier filed Australian provisional patent application no. 2015903257 filed 13 Aug. 2015, the entire contents of which are incorporated herein by reference.

FIELD OF INVENTION

This invention relates generally to a system for handling and freezing animal protein products, and in particular, to a system for continuously freezing such products and removal of the frozen products from the freezing system.

BACKGROUND ART

Plate freezers are well known in the food processing industry, particularly in the production of pet foods such as red meat pet food offal, fish for pet food, fruit and vegetable pulp, water (block ice) and waste organic product that requires freezing prior to disposal.

Plate freezers generally comprise a plurality of refrigerated plates mounted within a frame to define a space therebetween, into which the material is delivered to be frozen. Refrigerant is delivered to the plates to provide form such that the plates act as evaporators to absorb heat energy from the product thereby rapidly freezing the product. Once frozen the refrigerant circuit is able to be reversed to provide warm gas to the plates to defrost the contact zone between the frozen product and the plate surface to facilitate removal of the frozen product from the plates. In most commercially available plate freezing devices, it is desirable that the material to be frozen is able to be quickly loaded into the space formed between the plates and that the frozen material can then be quickly removed as required.

For this reason, a variety of different types of plate freezers have been proposed to improve the automation of such devices so as to reduce the amount of labour required to operate the devices and to minimise handling of product both pre- and post-freezing. Such systems have included hoppers for filling the plate freezers as well as various means for automatically releasing the frozen blocks onto a conveyor system, all with various degrees of success.

Typically, most commercially available bare block plate freezers employ a vertical lift system that, after the product has been frozen and the interface between the product and plates defrosted, the plates are separated and the floor of the system is raised to lift the frozen blocks above the top of the plates for removal. The floor of each of the plates is typically attached to a common rail which is activated by a vertical ram to raise the blocks above the top edge of the plates for removal. Removal is typically achieved by manually transferring the frozen blocks onto a pallet or conveyor that extends parallel to the plate freezer and in some instances a movable slide can be assist to aid in the manual transfer of the blocks. The conveyor is then able to transfer the frozen block to a palletising station where it is then able to be guillotined, palletised and wrapped, as desired.

A problem with such existing commercial plate freezers is that they are labour intensive as it can take up to 10 minutes to unload each plate freezer depending upon the number of plates employed. Further, as the blocks are frozen to −15° C. and can weigh up to 70 Kgs, the manually handling of these blocks can present significant safety hazards and requires much skill and effort. Further, through handling the blocks there may be a risk of bacterial contamination of the product. Also, most existing commercial applications employ a conveyor that extends parallel to the plate freezer unit which is an inefficient use of space.

Thus, there is a need to provide a plate freezer apparatus that is an improvement over existing devices and which addresses at least some of the disadvantages of existing systems.

The above references to and descriptions of prior proposals or products are not intended to be, and are not to be construed as, statements or admissions of common general knowledge in the art. In particular, the above prior art discussion does not relate to what is commonly or well known by the person skilled in the art, but assists in the understanding of the inventive step of the present invention of which the identification of pertinent prior art proposals is but one part.

SUMMARY OF THE INVENTION

Accordingly, in one aspect of the invention there is provided a plate freezer apparatus comprising:

a first frame member configured to support a plurality of vertically disposed freezing plate members arranged to define a freezing cavity therebetween and a flooring system configured to extend below the freezing plate members to form a base for the freezing cavities, wherein the flooring system is configured to be raised so as to lift any frozen material present in freezing cavities out of the freezing cavities so that the frozen material extends from the freezing cavities to project above an upper edge of the freezing plate members; and a second frame member mounted above said first frame member so as to extend substantially a length of the first frame member, the second frame member having a plurality of paddle members mounted therein that are individually actuable to extend between a horizontal axis where the paddle members extend substantially parallel with the second frame member, and a vertical axis where the paddle members extend from the second frame member to be received between the frozen material raised from the freezing cavities;

wherein the first frame member further comprises a lifting mechanism adjacent a proximal end thereof, the lifting mechanism being actuable to raise the proximal end of the first frame member so as to tilt the first frame member towards a distal end and wherein the paddle members are actuable to facilitate controlled release of the frozen material such that upon release the frozen material is able to slide along the upper edges of the plates and off the distal end of the first frame member for collection.

The paddle members may be mounted on a third frame member which is movably mounted within the second frame member. A linear actuator is mounted to the second frame member to apply a sliding linear force to the third frame member to apply sliding movement to the third frame movement within the plane of the second frame member. The sliding linear force may be applied to the third frame member by the linear actuator following activation of the lifting mechanism of the first frame member and when the frozen material is raised above the upper surface of the freezer plate members and the paddle members are positioned between the frozen material so as to cause the frozen material to disengage from the flooring system.

Following application of the sliding linear force to the third frame member, each of the paddle members may be individually actuable to be moved into a horizontal position so as to sequentially release the frozen material to slide towards and over the distal end of the first frame member for collection.

The frozen material may be collected by a harvest conveyor or pallet for further processing.

According to yet another aspect, the present invention provides a method of operating the plate freezer apparatus according to the present invention, comprising:

forming the freezing cavity by moving pairs of the freezing plate members together;
delivering material to be frozen into the freezing cavity;
supplying refrigerant material to the freezer plates to cause the material to freeze within the freezing cavity to form a block of frozen material;
opening the freezing cavity and raising the block of frozen material such that it extends above the upper surface of the freezing plates such that neighbouring block of frozen material as a paddle member located therebetween;
raising the proximal end of the first frame member to cause the first frame member to tilt towards the distal end;
applying the sliding motion to the third frame member to cause the blocks of frozen material to break contact with the flooring surface;
individually activating each of the paddle members to sequentially release the blocks of frozen material such that the blocks of frozen material can slide towards and over the distal end of the first frame member; and
collecting the blocks of frozen material as they are caused to slide over the distal end of the first frame member.

According to another aspect of the invention, there is disclosed a cleaning system for cleaning the plate freezer apparatus according to any one of claims 1-6, comprising:

a first pair of spray bars, each of the first pair of spray bars being mounted to an upper surface of the first frame member so as to be located above the upper edge of the freezing plate members to extend along opposing sides of the freezing cavities;
a second pair of spray bars, mounted adjacent the upper edge of freezing plate members so as to extend along opposing sides of the freezing cavities; and
a plurality of spray balls, the spray balls being arranged in pairs and mounted to a leg of the movable flooring system so as to be located below the floor of the flooring system such that as the flooring system is raised and lowered within the freezing cavities the pair of spray balls are also raised and lowered within the cavities;
wherein each of the first pair of spray bars, the second pair of spray bars and the pairs of spray balls are connectable to a fluid source to spray fluid therefrom to wash the plate freezer apparatus as the plate freezer apparatus undergoes a dedicated cleaning cycle.

The cleaning system of this aspect of the invention further comprises a controller for controlling the operation of the apparatus and first pair of spray bars, second pair of spray bars and pairs of spray balls to facilitate cleaning of the apparatus. The controller may be a programmable logic controller that is also provided to control the apparatus during use.

Each of the first spray bars and second spray bars may have a plurality of holes cut therealong to spray fluid therefrom in a predetermined arc. The holes may be cut in the first and second spray bars by way of a laser cutting process such that the fluid sprayed therefrom is directed to a predetermined area defined by the predetermined arc. The holes cut in the first spray bars may deliver fluid into each of the freezing cavities. The holes cut in the second spray bars may deliver fluid onto a top surface and respective side surface of each of the plates of the freezer cavities.

The spray balls may be configured to deliver a spray of fluid in a substantially 360° arc so as to clean the walls of the plates as the spray balls are raised and lowered within the freezing cavities.

BRIEF DESCRIPTION OF THE DRAWINGS

The invention may be better understood from the following non-limiting description of preferred embodiments, in which.

DETAILED DESCRIPTION OF AN EMBODIMENT OF THE INVENTION

The present invention will be described below in relation to its application for use in creating frozen blocks of animal protein matter, such as red meat pet food offal. However, it will be appreciated that the present invention could be equally employed in forming a variety of frozen blocks of matter, such as fish for pet food, fruit and vegetable pulp, water (block ice) as well as waste organic product that requires freezing prior to disposal.

Figure 1:
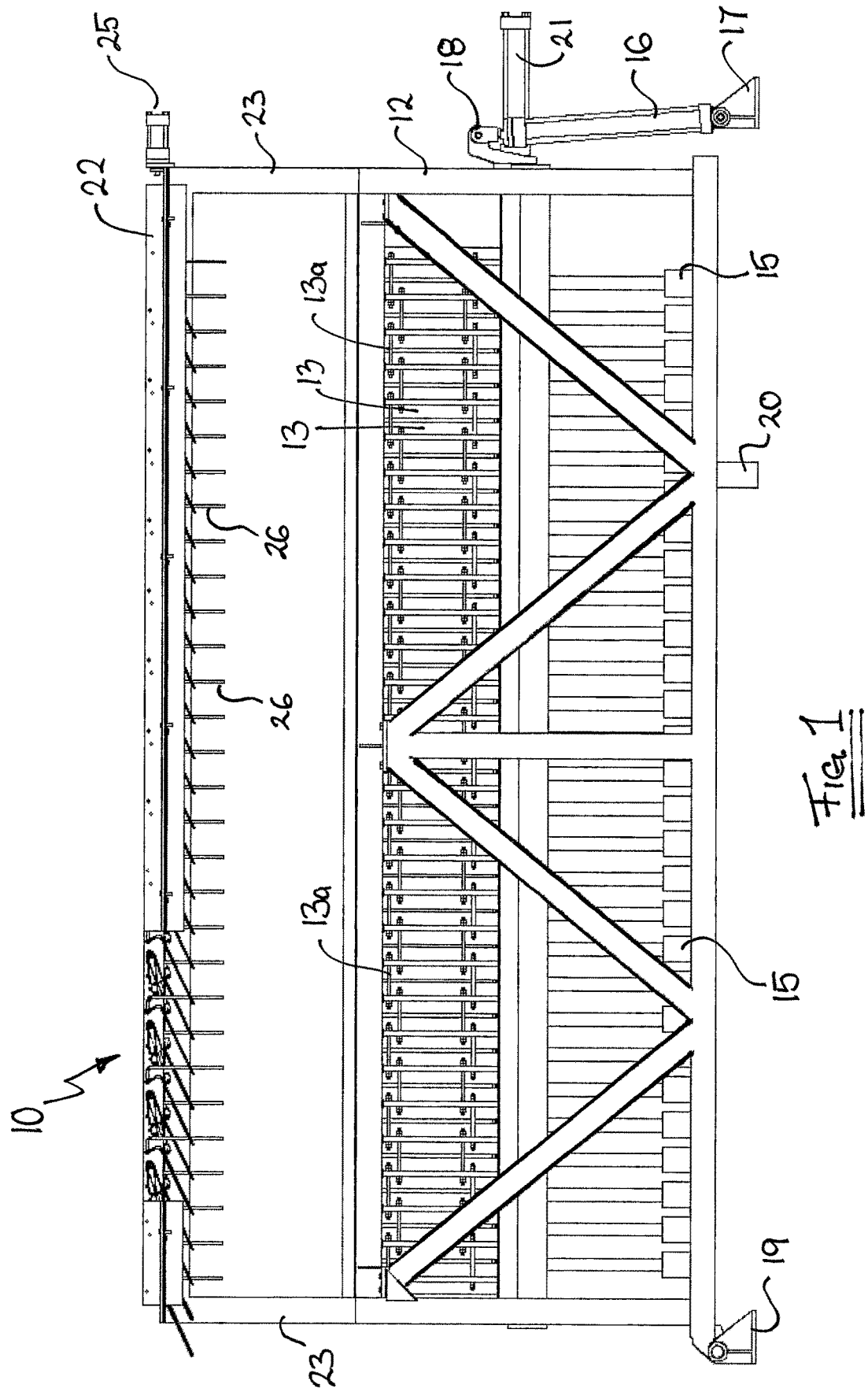
FIG. 1 is a side view of a plate freezer apparatus in accordance with an embodiment of the present invention.

Referring to FIG. 1, a plate freezer apparatus 10 is depicted comprising a main body frame 12 within which a plurality of vertically aligned freezing plates 13 are arranged for use in a conventional manner. The freezing plates 13 are arranged in pairs and together define a vertical space into which the food product may be received for freezing. Each plate 13 is made from hollow aluminium and is configured to receive a liquid refrigerant pumped from a refrigeration circuit that absorbs the heat energy from the food product located between the plates 13, thereby causing the food product to freeze into a block.

Each plate 13 is linked to the other plates by way of a draw bolts 13a and a plate opening ram 21 is attached to the end most plate to facilitate opening and closing of the plates. In this regard, by activating the plate opening ram 21, the plates 13 are able to be moved apart by approximately 10 mm to facilitate removal of the frozen blocks, as will be discussed in more detail below.

Figure 3:
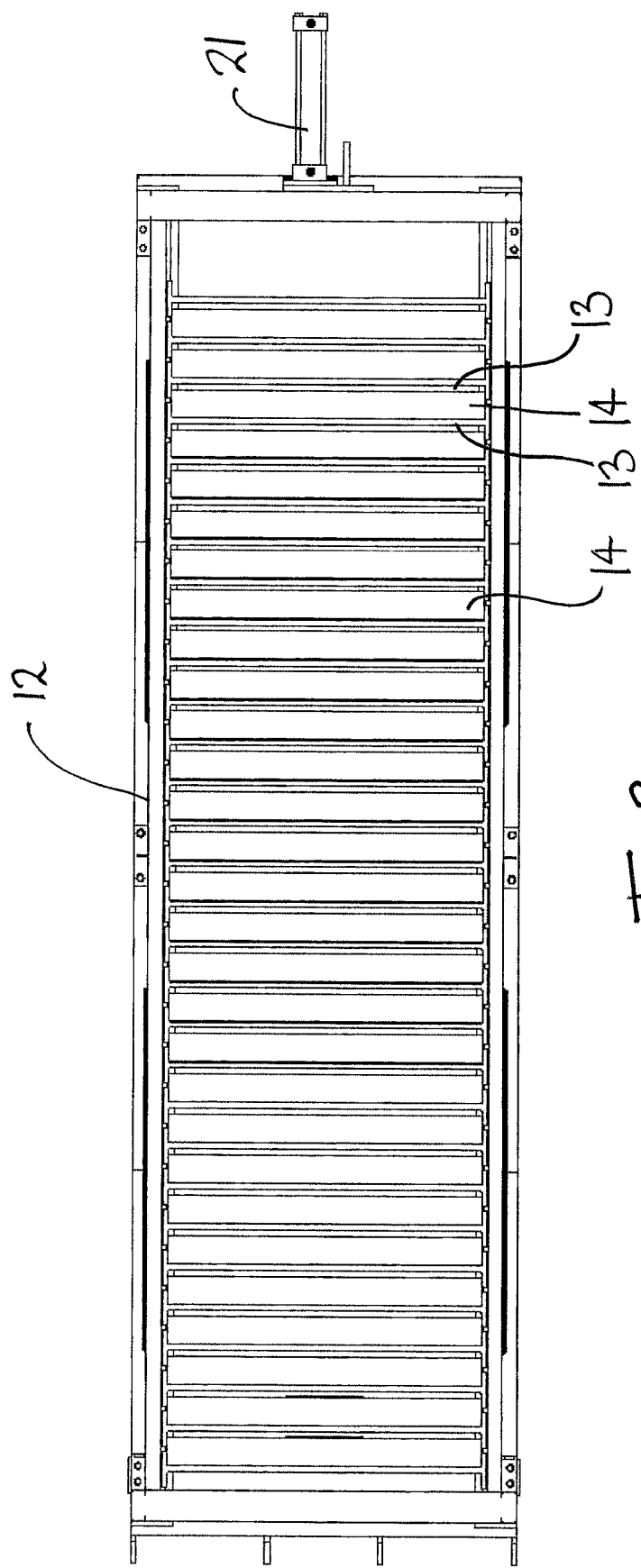
FIG. 3 is a top view of the plate freezer apparatus of FIG. 1 with the upper frame member removed.

Referring to FIG. 3 the main body frame 12 of the plate freezer apparatus is depicted showing the plates 13 in a separated mode. In this position, the floor 14 of the system can be readily seen which defines the base of the cavity into which the food product is to be fed. As will be discussed in more detail below, the floor 14 of each cavity is attached to a common rail 15 that extends along the base of main body frame 12. A pair of vertical lifting rams 30, 31 are mounted on each end of the main body frame 12 and are attached to the common rail 15 to raise the rail and lift each floor to the level of the top edge of the plates 13, thereby raising the frozen blocks such that they are exposed above the top of the plates, as will be discussed in more detail below.

The main body frame 12 is supported on a ground surface at one end by lifting ram 16. Lifting ram 16 has a pivot foot 17 that engages with the floor surface and connects with the main body frame 12 at a lifting point 18 provided on the end of the main body frame 12. The other end of the main body frame 12 has a pair of pivot legs 19 provided on either side thereof which engages with the floor surface and which are capable of pivoting to accommodate the opposing end being lifted and lowered by the lifting ram 16, in a manner as will be discussed in more detail below. An additional support 20 will be provided on an underside of the main body frame 12 to support the plate freezer apparatus 10 in a stable position on the floor surface. In a preferred embodiment the plate freezer apparatus 10 is permanently mounted on the floor surface with a forward tilt of around 5°.

Figure 2:
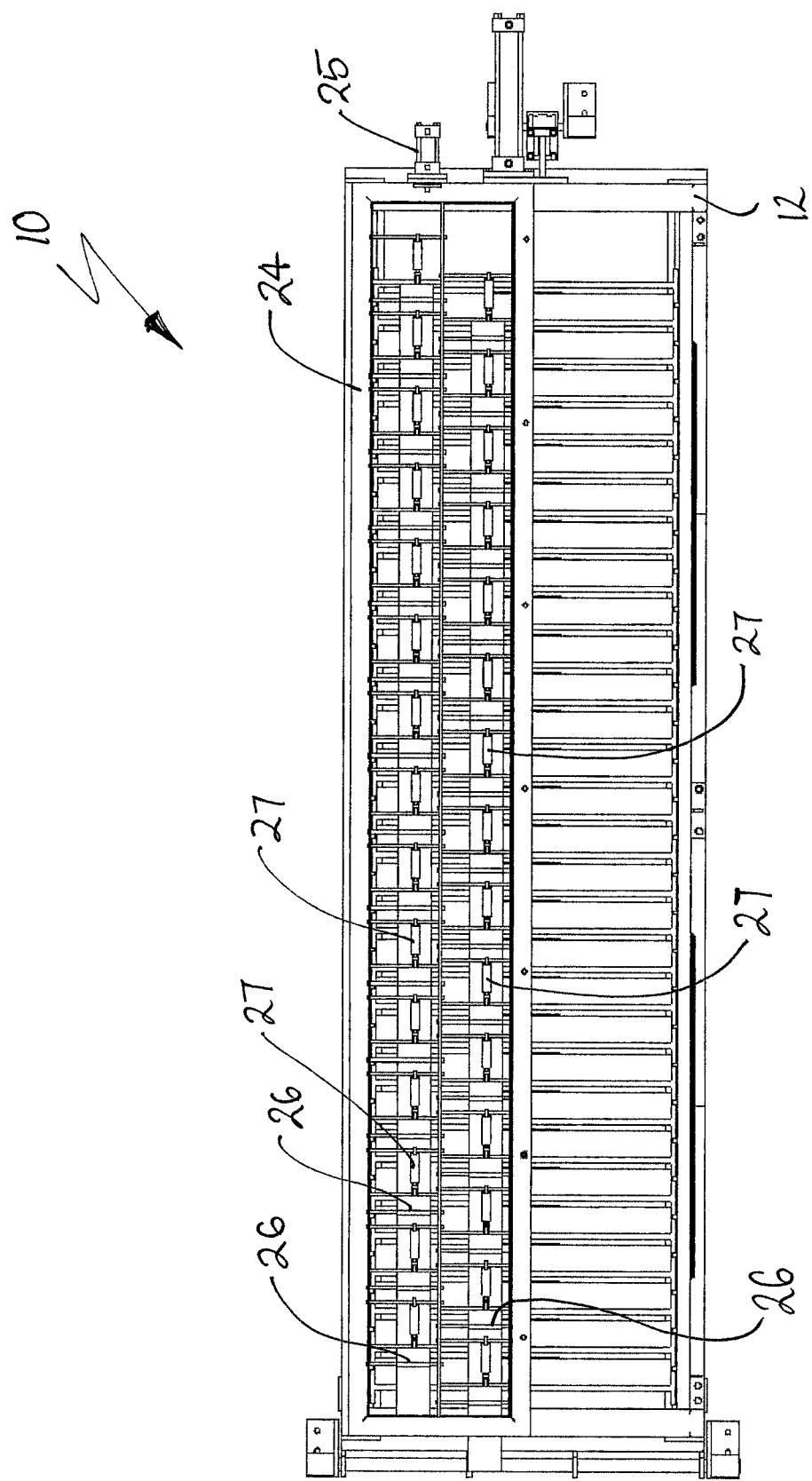
FIG. 2 is a top view of the plate freezer apparatus of FIG. 1.

Referring to FIG. 1, an upper frame member 22 is mounted above the main body frame 12 of the plate freezer apparatus by way of a pair of end supports 23. In a preferred form, the upper frame member 22 is mounted around 560 mm above the top of the plates 13 of the main body frame 12 and comprises an inner frame member 24 as is more clearly depicted in FIG. 2. The inner frame member 24 is configured to be slidably movable within the upper frame member 22 under the action of pusher ram 25. The pusher ram preferably has an 80 mm stroke to define the degree of sliding movement that the inner frame member 24 performs under action of the pusher ram 25.

The inner frame member 24 has a plurality of independent pneumatically operated paddles 26 mounted thereto. The paddles 26 are configured to hang vertically down from the inner frame member 24 towards the main body frame 12 and extend in two rows with paddles in adjacent rows being offset from each other. Each paddle 26 is approximately 220 mm long and is actuated to move between a vertical and a horizontal position by way of individual pneumatic actuators 27. As will be discussed in more detail below, when the paddles 26 are in the vertical position, each paddle is spaced so as to be located between the frozen blocks when the blocks are raised for unloading. It will be appreciated that each paddle has its own controller that is individually addressed and actuated by way of a programmed PLC or manually as required.

Referring to FIG. 1, the plate freezer apparatus 10 is positioned so as to receive the food material within the cavity formed between the plates 13 and the floor 14 of the cavity. Prior to filling the cavities, the paddles 26 are actuated such that they are positioned in a horizontal frame to ensure that there is sufficient clearance above the plates 13 to facilitate filling of the cavities with food material. In this regard, the cavities of the plate freezer apparatus 10 may be filled by a conventional delivery hose and nozzle moving over the top of the plates 13. In some instances, the upper frame member 22 may be configured to be moved from a horizontal to a vertical position to provide clear access to the plate cavities if the filling is to be performed by a hopper or forklift tipping skip. It will be appreciated that during the filling step, the plate opening ram 21 will be closed to ensure that the plates 13 clamp together to provide a sealed cavity.

Once the plate cavities have been filed with food product, the refrigerant is supplied to the plates 13 to freeze the food material so as to form frozen blocks 40 of food material within each cavity. Following freezing and formation of the frozen blocks, a warm gas may be supplied to the plates 13 to defrost the surface of the plates to facilitate opening of the plates by activating the plate opening ram 21. Once the plate opening ram 21 is activated and the plates 13 are separated, the next phase of block removal is initiated.

In the block removal phase of operation of the plate freezer apparatus 10, the paddles 26 are actuated such that the pneumatic actuators 27 move the paddles 26 from the horizontal position for filling of the plate cavities, to the vertical position for removal of the blocks from the plate cavities.

Figure 4:
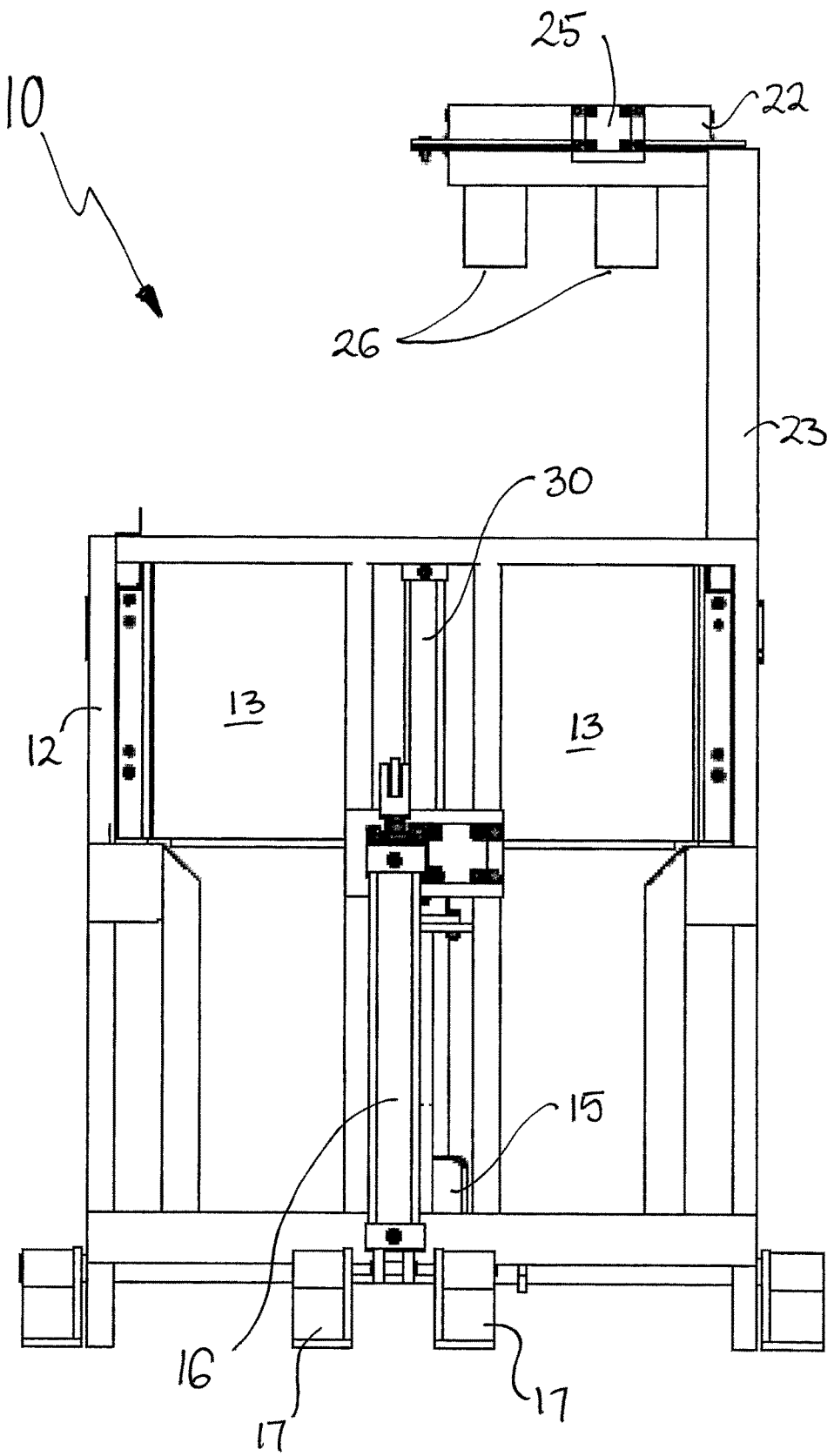
FIG. 4 is a right end view of the plate freezer apparatus of FIG. 1.
Figure 5:
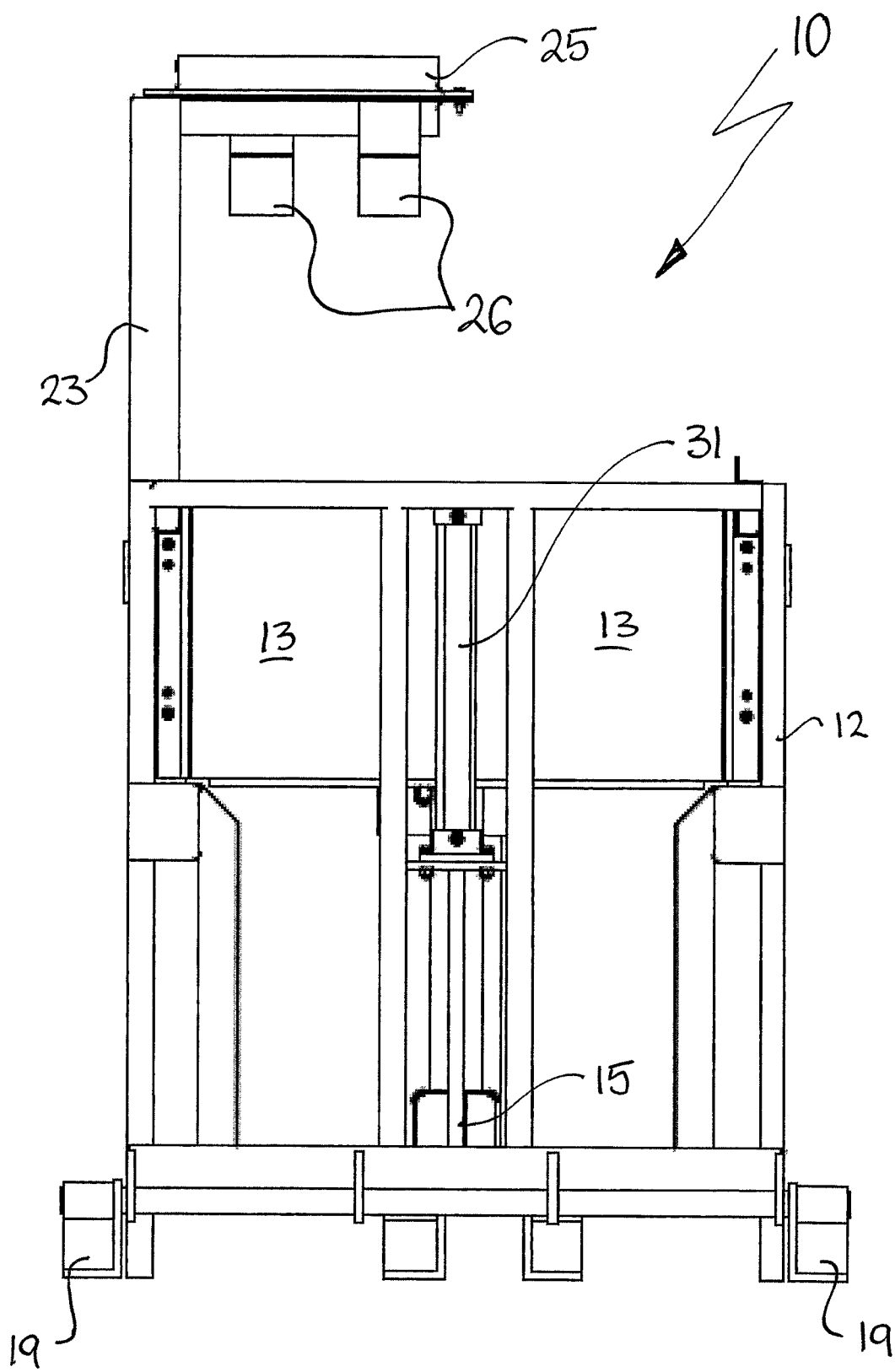
FIG. 5 is left end view of the plate freezer apparatus of FIG. 1.
Figure 6:
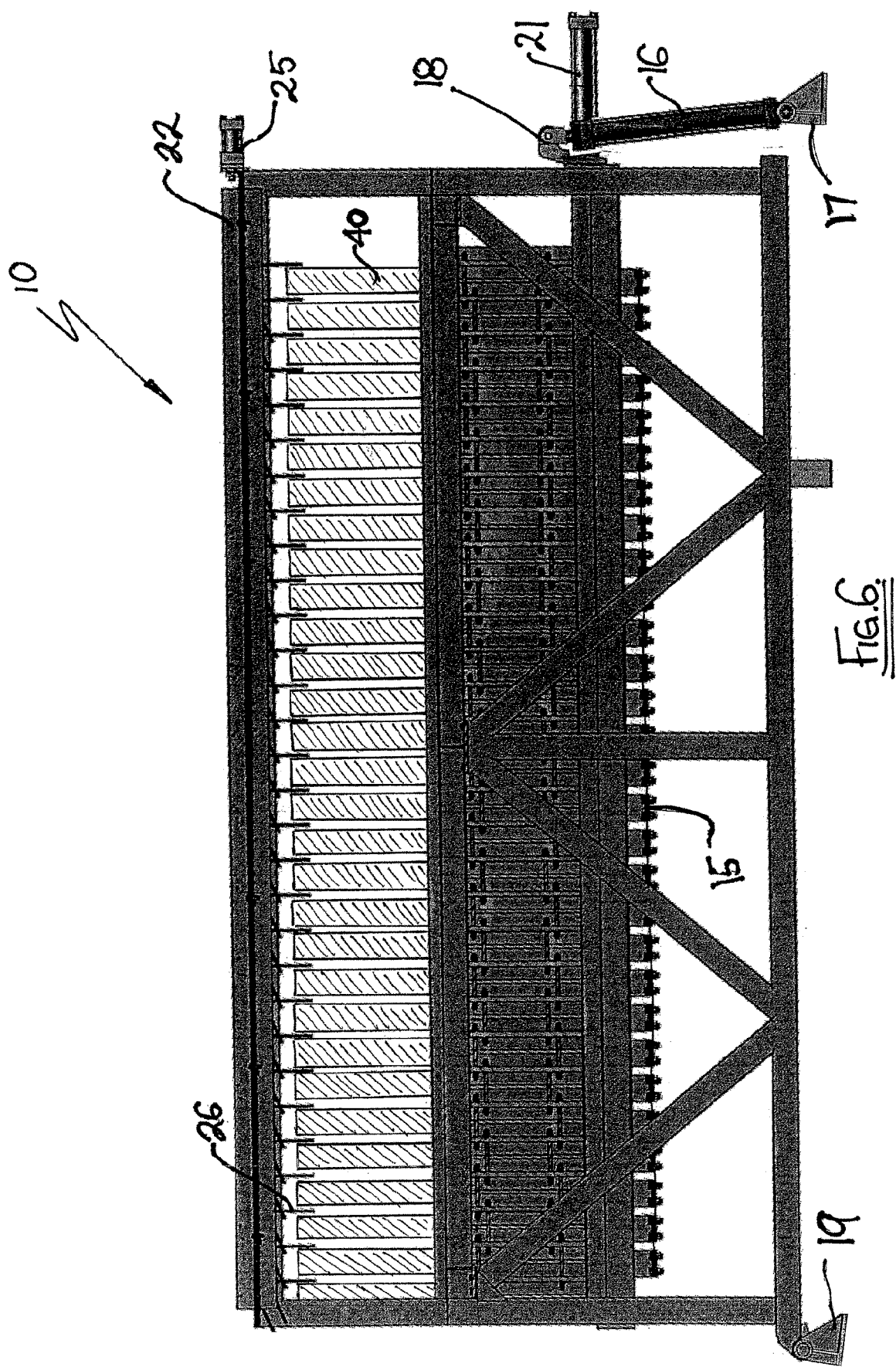
FIG. 6 is a side view of the plate freezer apparatus of FIG. 1 with the blocks in the raised position.

As shown in FIGS. 4 and 5, in order to raise the floor 14 between the separated plates 13, lifting rams 30 and 31 located at each end of the main body frame 12 are activated. As such, the floors 14 of each cavity are raised thereby lifting the frozen blocks from the cavities such that the bottom of each block 14 is supported by the floor 14 approximately 5 mm below the top edge of the plates 13. This arrangement is depicted in FIG. 6, where it is shown that when the blocks 40 are in this position, each paddle 26 is located between the blocks 40 and extends approximately 200 mm into the gap formed between the blocks 40.

Figure 7:
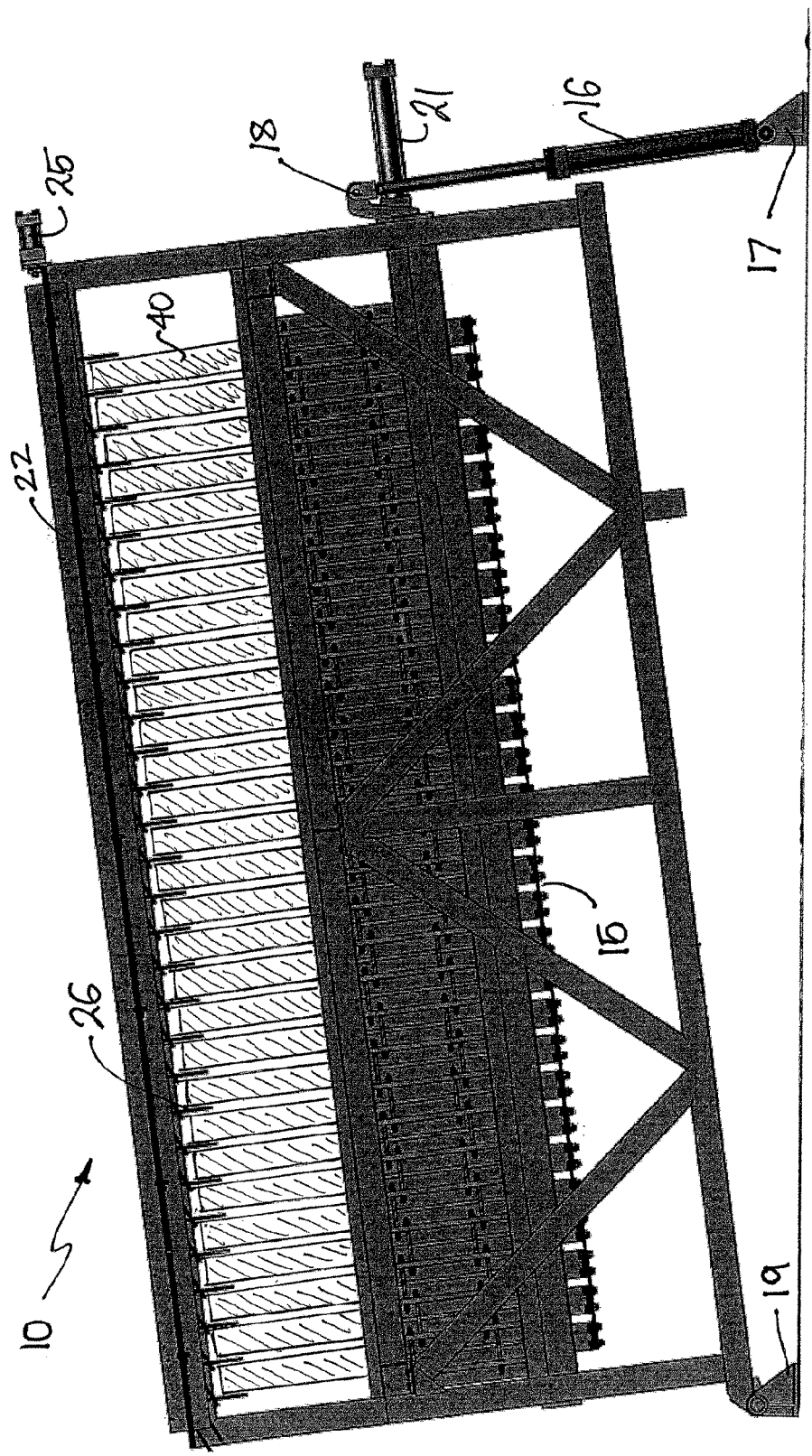
FIG. 7 is a side view of the plate freezer apparatus of FIG. 1 in the elevated position for dispensing the blocks in accordance with an embodiment of the present invention.

In this position, the lifting ram 16 is activated to lift the end of the main body frame 12 as depicted in FIG. 7. The stroke of the lifting ram 16 is determined so as to lift the end of the plate freezer apparatus 10 to create a suitable angle along the length of the apparatus to be sufficient to allow the frozen blocks 40 to slide along the surface of the upper edge of the plates 13 under gravity. It will be appreciated that the diameter of the lifting ram 16 will also be sufficient to lift the combined weight of the plate freezer apparatus 10 and the freezer blocks 40. Upon activating the lifting ram 16, the plate freezer apparatus 10 slopes towards the end below which a conveyor will be provided. As the entire plate freezer apparatus 10 is caused to tilt, it will be appreciated that the refrigeration hoses connecting the refrigeration system to the plate headers will be flexible to allow for such tilting movement whilst maintaining the integrity of the refrigeration seals.

In order to facilitate controlled sliding movement of the blocks 40 along the slope surface of the upper edges of the plates 13 toward the conveyor, as depicted in FIG. 7, the pusher ram 25 connecting the inner frame member 24 to the upper frame member 22 is activated. This causes the inner frame member to which the paddles 26 are mounted to move forward such that the paddles 26 function to push in unison against the rear surface of each block 40. The force of this combined push 40 is sufficient to break the connection between the frozen bottom of the block 40 and the cavity floor 14. Despite the action of this pushing motion, the blocks 4 are prevented from falling over and sliding en-masse in an uncontrolled manner due to the combined restraining force of the preceding paddle 26 on the downhill side of the block 40 and the 5 mm lip between the cavity floor and the top of the plate 13 which ensures that the bottom of the block cannot slide down the slope.

At this stage, the harvest conveyor located immediately below the lower end of the plate freezer apparatus 10 is activated. Each paddle 26 from the end closest to the conveyor is then independently and sequentially actuated by actuators 27 to return to the horizontal position. In doing so, the movement of the paddle from the vertical position to the horizontal position allows the individual blocks to tip over onto the top of the plates 13 and slide toward and onto the conveyor to be conveyed for palletising in the conventional manner. It will be appreciated that the lower end of the plate freezer apparatus 10 will be provided with rails to assist in preventing the blocks 40 from falling off the end and aligning the blocks toward, and onto, the conveyor.

It will be appreciated that the system and process of the present invention has a number of advantages over the prior art systems. In this regard, there is no labour required to unload the plates and by extension, there are no labour costs or OH&S issues associated with such manual handling. The speed of unload of the blocks is only limited by the palletising speed, which may be less than 1 minute per tonne (2.5 seconds per cavity) unload speed with robotic block sizing and palletising. Further, there is no chance of bacterial contamination from manual handling of the blocks. These benefits are achievable by a system that can be simply modified so as not to interfere with the filling process whether that is by pump filling individual cavities or via bulk fill. Such a system as that described above can be simply retro-fitted to existing plate freezer units and can be easily adapted to a variety of sites. The system is easy to clean and service as it uses off-the-shelf parts and provides for efficient use of available space as it utilises a diagonal layout with respect to the conveyor, rather than the previous parallel layout.

Figure 8:
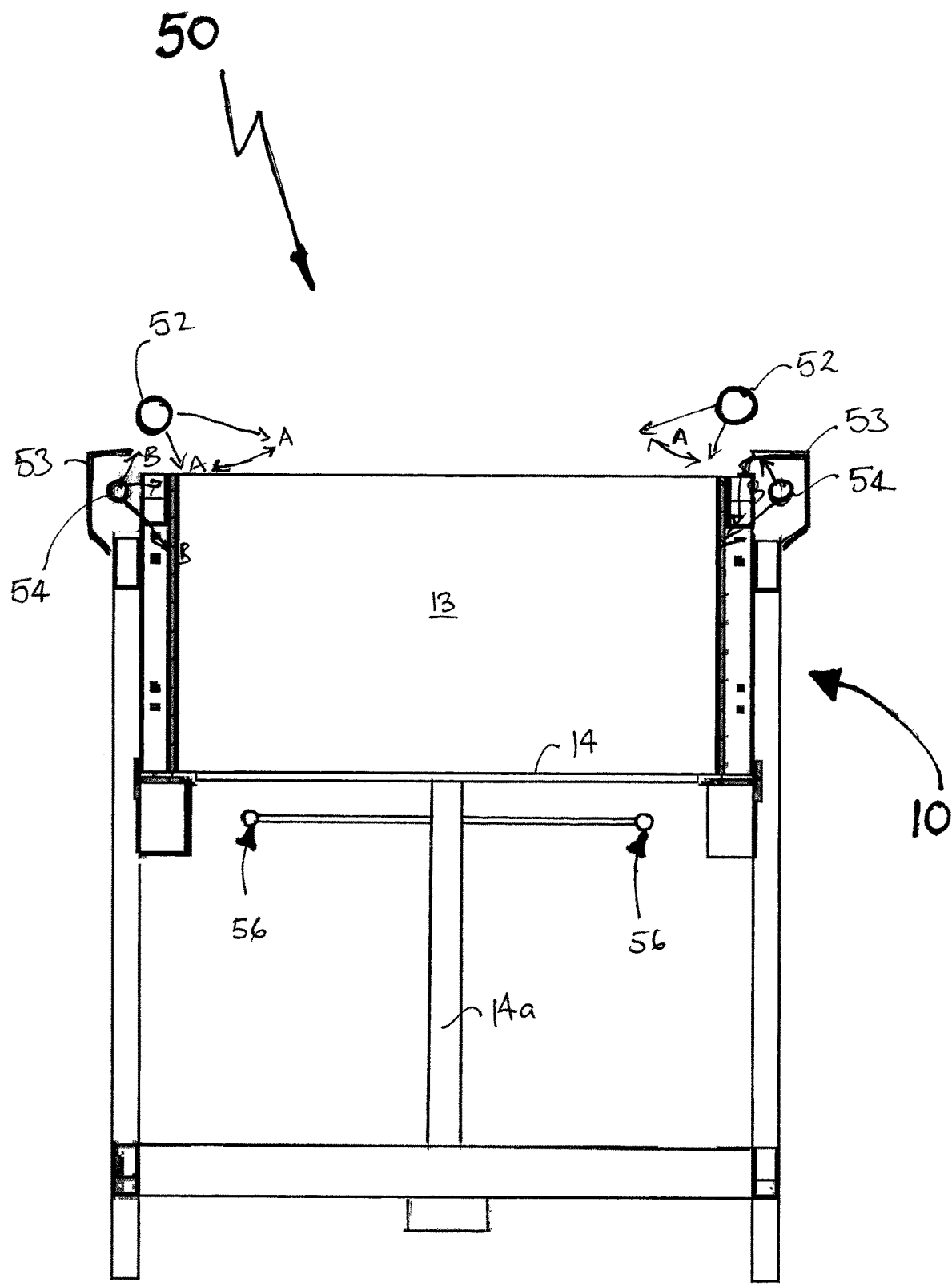
FIG. 8 is a simplified end view of the plate freezer apparatus showing a cleaning system installed for use.

To facilitate cleaning of the apparatus 10, the apparatus 10 may be fitted with a cleaning system as depicted in FIG. 8.

Cleaning of traditional bare block plate freezing systems has generally relied upon manual hosing of the vacant freezer cavities and surrounding areas after the frozen blocks have been removed from the apparatus. To achieve this sufficiently, the cleaning process can take considerable time—about 30 seconds per cavity or around 20 minutes for a 36 cavity, two-tonne apparatus. For pet food applications, although desirable, it is not a necessary requirement to clean the cavities of the apparatus between freezing cycles when using meat products of the same type and species. However, for human consumption and pet food applications where different types/species of meat products are to be used, it is necessary to fully wash the cavities after each freezing cycle, which is a major impediment to the uptake of bare block freezers for such applications.

For an apparatus 10 such as that described above, the provision of an automated apparatus that is controlled by an electronic control system provides a basis for automating the cleaning system and cleaning the apparatus 10 during the process. This is achieved by mounting the cleaning system 50 to the apparatus 10 in the following manner.

The cleaning system 50 comprises two spray bars 52 mounted to extend along opposing sides of the upper surface of the main body frame 12. In a preferred from, each of these spray bars is around 50 mm in diameter and have 72 laser cut holes formed therein to spray fluid therefrom in an arc as depicted by arrows A. As the spray bars 52 extend along opposing sides of the apparatus 10, they can also function as guide rails to assist in guiding the blocks as they slide towards the conveyor during the unloading phase. The spray bars are also preferably supplied with cleaning fluid from a 50 mm supply pipe controlled through a programmed ball valve to deliver the fluid under pressure.

The cleaning system 50 also comprises a second pair of spray bars 54 that also extend along the length of the main body frame 12 along an underside of an angle 53 provided along the upper edge of main body frame 12. The spray bars 54 preferably have a diameter of around 32 mm and have 36 laser cut holes formed there along to direct spray to the underside of the angle 53 and the top of the plates 13 which are covered by the angle 53. The laser cut holes are located along the spray bars to also direct water along the side walls of the plate 13. Each of the spray bars 54 is preferably supplied with fluid via a direct coupling to the end of the spray bars 52.

The final part of the cleaning system 50 comprises a plurality of spray balls 56 mounted on each leg 14*a* directly beneath the floor 14. Preferably, there are seventy-two spray balls 56 arranged in pairs for cleaning each cavity. The spray balls 56 are mounted on the end of pipes 57 which are preferably welded on each side of the leg 14*a*. Each leg 14*a* is supplied with washing fluid from a manifold formed on the underside of the base of the main body frame 12 via a flexible hose such that the washing fluid can be sprayed from the pair of spray balls 56 under pressure. It will be appreciated that as the floor 14 is lifted and lowered within the cavity, the spray balls 56 will extend into the cavity to facilitate cleaning of the cavity in a manner to be described in more detail below.

Whilst not shown, the cleaning system 50 may also comprise a high pressure/high volume pump to supply the system 50 with washing fluid at a capacity of around 400 litres/minute and a pressure of around 4 bar. The system may include an in-line detergent injection system to assist in cleaning as well as a PLC control unit and associated software to coordinate the cleaning system in a manner to be described below.

The various stages of cleaning the apparatus 10 with the cleaning system 50 will be described below in relation to FIGS. 9-12.

Figure 9:
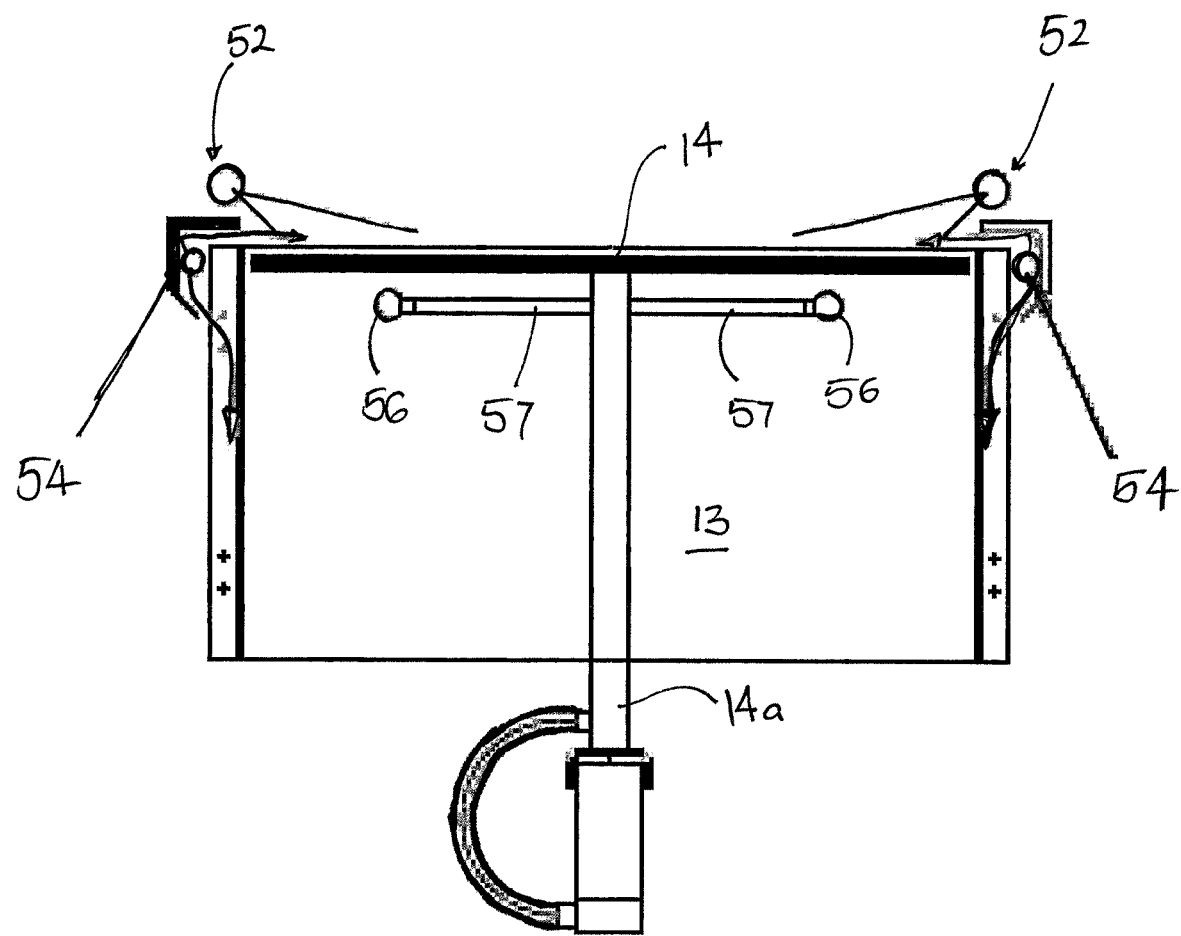
FIGS. 9-12 show four separate cleaning stages for operating the cleaning system of FIG. 8.

FIG. 9 depicts a first stage of cleaning and is representative of the apparatus 10 being in an unloaded state, whereby the floor 14 is in its uppermost position between plates 13 to push the blocks out of the cavity. Once the blocks have been removed from the apparatus 10, the floor 14 is maintained in its upper state and the spray bars 52 are activated to deliver washing fluid to clean the top surface of the floor 14 as shown. At the same time, spray bars 54 are activated to deliver washing fluid to the underside of the angle 53. This causes the washing fluid to be directed in a downward manner down the external sides of the plates 13. Due to the washing action requiring no operator involvement, the washing fluid can be delivered at a temperature of around 80 degrees Celsius and can include a suitable detergent.

Figure 10:
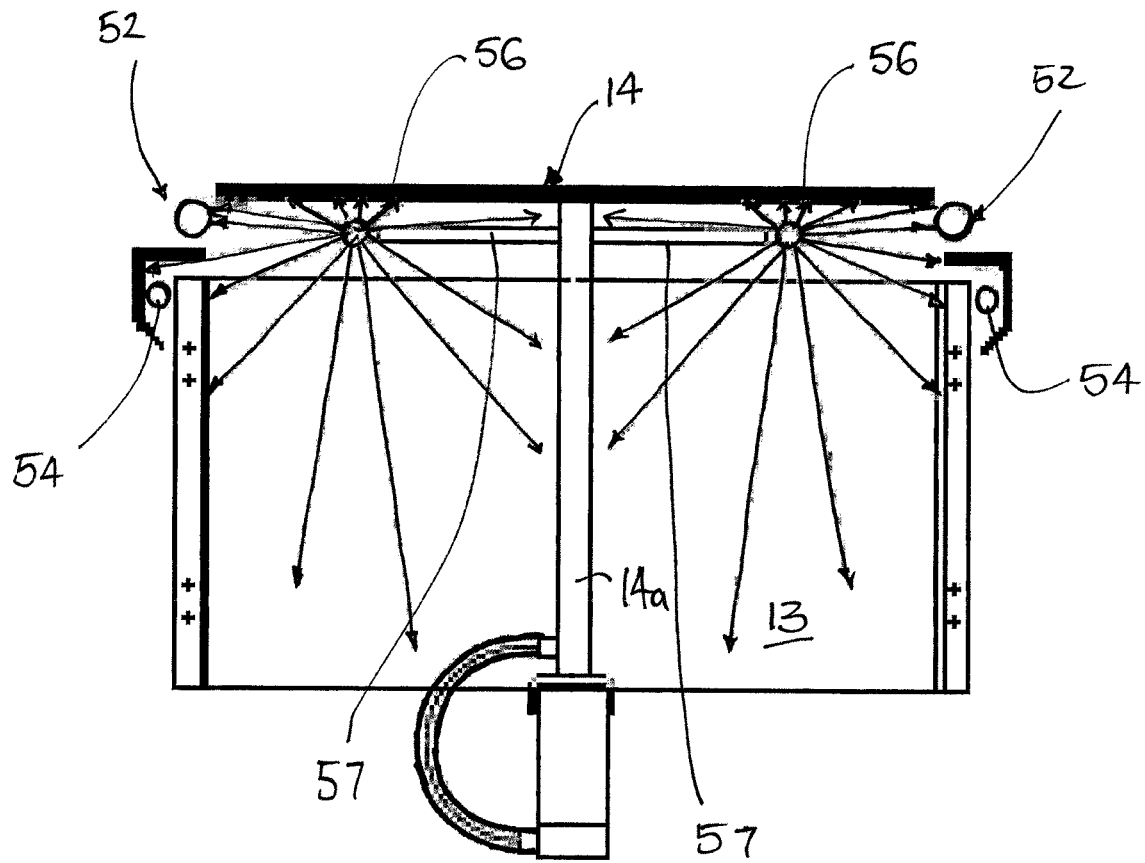

Referring to FIG. 10, after the first stage has been completed, the floor 14 may be fully lifted such that it the floor 14 and the spray balls 56 mounted underneath the floor 14, are located above the top edge of the plates 13, as shown. This lifting action occurs whilst the spray bars 52 remain activated such that the spray bar 52 applies washing fluid fully across the length of the floor and any residual solids present thereon can easily pass through the gap provided between the top edge of the plates 13 and the elevated floor 14. In the fully raised position, the spray balls 56 can be actuated and the spray bars 52 turned off to enable the spray balls 56 to clean the underside of the floor 14 which then directs the cleaning water onto the top edge of the plates 13. This action of the spray balls also cleans the external surfaces of the spray bars 52 and 54 and the surface of the angle 53.

Figure 11:
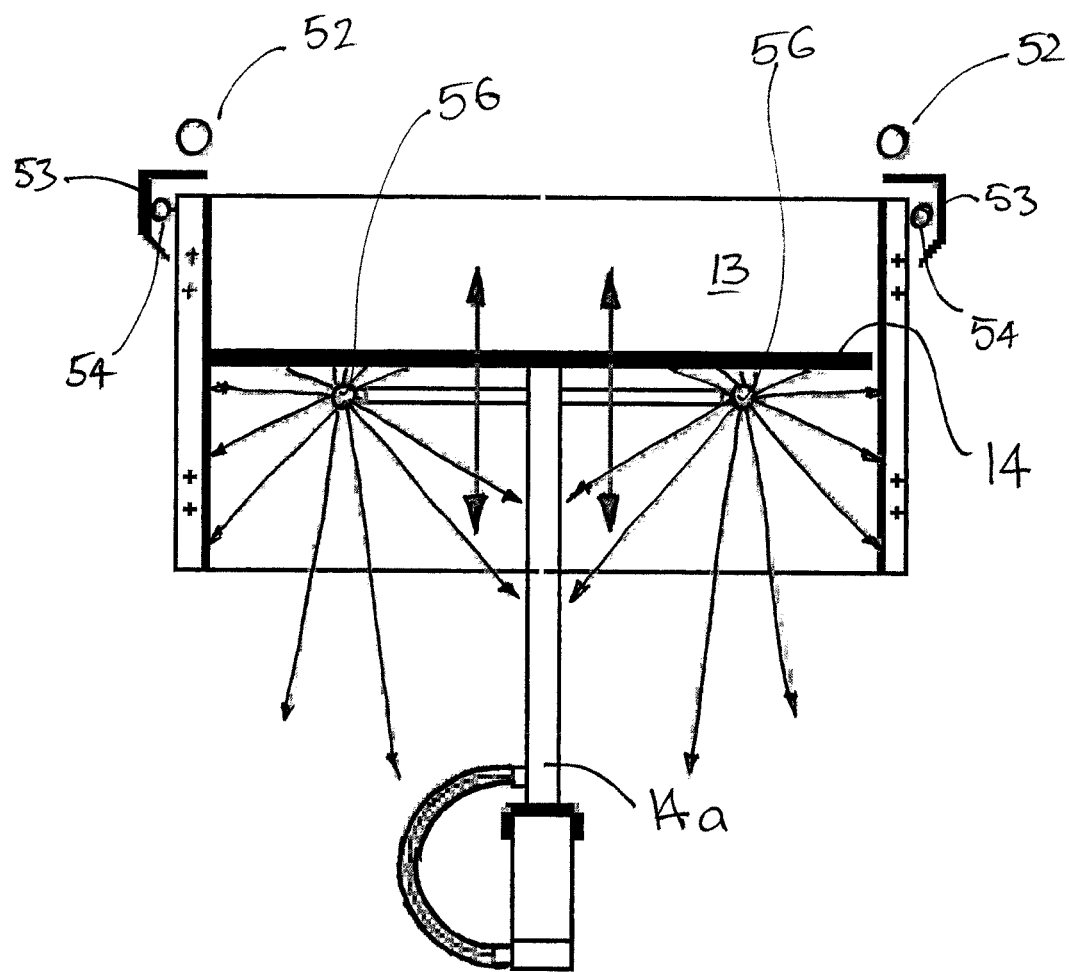

The third cleaning stage is depicted in FIG. 11, whereby the floor 14 is caused to lower whilst the spray balls 56 remain activated to spray cleaning fluid therefrom. In this arrangement, as the floor lowers, the spray balls 56 function to clean the internal surfaces of the cavities. This stage can include repetitive raising and lowering of the floor 14 between the plates 13 to facilitate thorough cleaning of the cavity as required.

Figure 12:
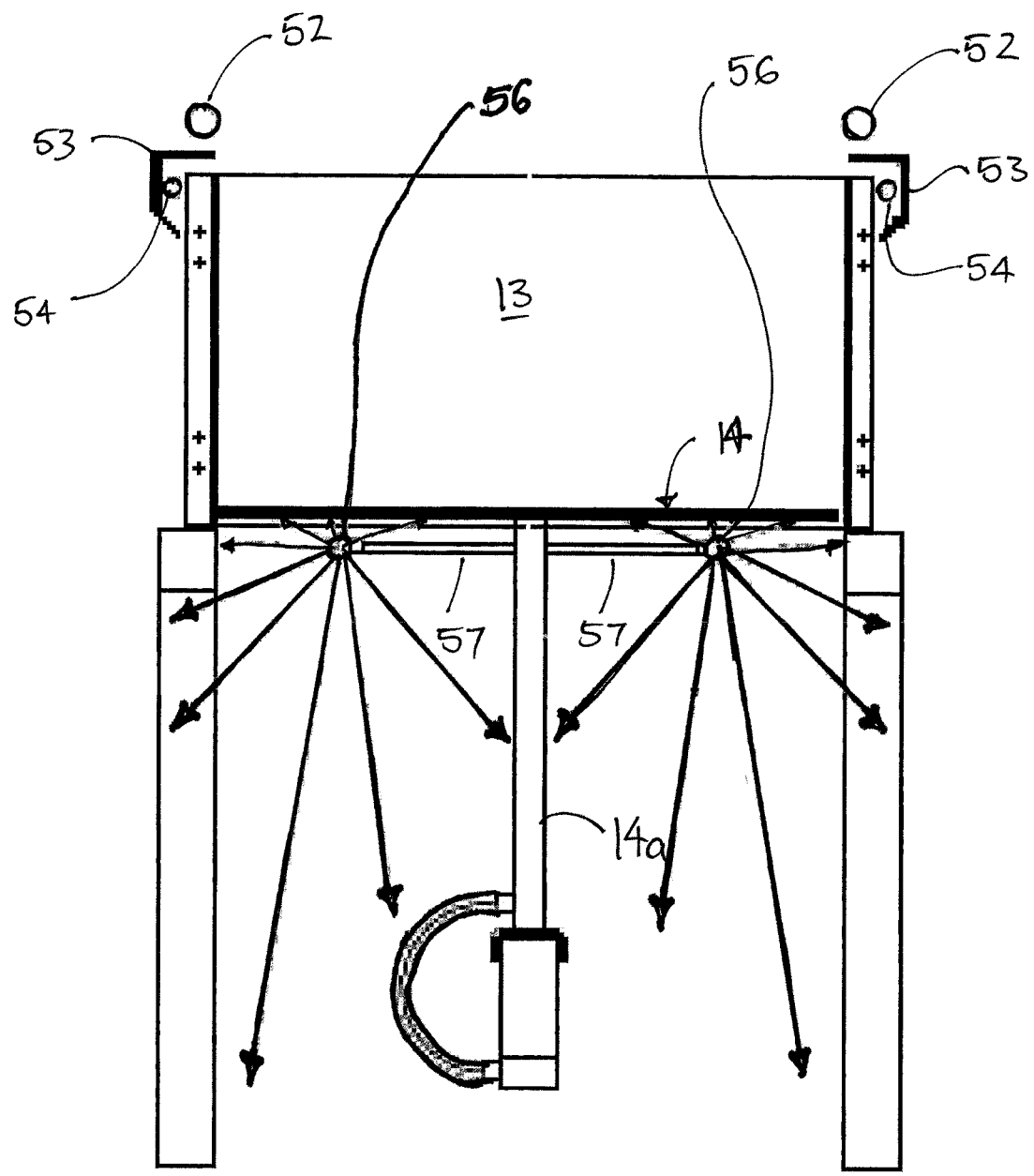

The fourth stage of cleaning is depicted in FIG. 12, where the floor is lowered to its lowermost position. In this position the spray balls 56 remain activated to deliver a spray of cleaning fluid therefrom to clean the floor lifting structure and the lower portion of the main body frame 12, only part of which is shown in FIG. 12. The spray balls remain active for a predetermined period of time after which they are turned off to complete the cleaning cycle and enabling reuse of the apparatus 10.

It will be appreciated that by controlling the cleaning system 50 in the manner as described above, the apparatus can be simply and effectively cleaned without operator involvement, enabling higher fluid temperatures and faster cleaning times. Cleaning cycles can be routinely programmed within a production cycle to ensure quality of the process whilst minimising downtime of the apparatus for cleaning. The use of the spray bars also provides a simple guide means for guiding sliding movement of the blocks towards the conveyor system during use of the apparatus.

Thus, it will be appreciated that the plate freezer apparatus of the present invention is unique in the manner in which it raises one end of the apparatus to create a sliding deck and uses individually actuable paddles to sequentially facilitate controlled sliding of the blocks onto a harvesting conveyor.

Throughout the specification and claims the word "comprise" and its derivatives are intended to have an inclusive rather than exclusive meaning unless the contrary is expressly stated or the context requires otherwise. That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the plate freezer apparatus uppermost.

It will be appreciated by those skilled in the art that many modifications and variations may be made to the methods of the invention described herein without departing from the spirit and scope of the invention.

The claims defining the invention are as follows:

1. A plate freezer apparatus comprising:
   a first frame member configured to support a plurality of vertically disposed freezing plate members arranged to define a freezing cavity therebetween and a flooring system configured to extend below the freezing plate members to form a base for the freezing cavities, wherein the flooring system is configured to be raised so as to lift any frozen material present in freezing cavities out of the freezing cavities so that the frozen material extends from the freezing cavities to project above an upper edge of the freezing plate members; and
   a second frame member mounted above said first frame member so as to extend a length of the first frame member, the second frame member having a plurality of paddle members mounted therein that are individually actuable to extend between a horizontal axis where the paddle members extend substantially parallel with the second frame member, and a vertical axis where the paddle members extend from the second frame member to be received between the frozen material raised from the freezing cavities;
   wherein the first frame member further comprises a lifting mechanism adjacent a proximal end thereof, the lifting mechanism being actuable to raise the proximal end of the first frame member so as to tilt the first frame member towards a distal end and wherein the paddle members are actuable to facilitate controlled release of the frozen material such that upon release the frozen material is able to slide along the upper edges of the plates and off the distal end of the first frame member for collection.

2. A plate freezer apparatus according to claim 1, wherein the paddle members are mounted on a third frame member which is movably mounted within the second frame member.

3. A plate freezer apparatus according to claim 2, wherein a linear actuator is mounted to the second frame member to apply a sliding linear force to the third frame member to apply sliding movement to the third frame movement within the plane of the second frame member.

4. A plate freezer apparatus according to claim 2, wherein the sliding linear force is applied to the third frame member by the linear actuator following activation of the lifting mechanism of the first frame member and when the frozen material is raised above the upper surface of the freezer plate members and the paddle members are positioned between the frozen material so as to cause the frozen material to disengage from the flooring system.

5. A plate freezer apparatus according to claim 4, wherein following application of the sliding linear force to the third frame member, each of the paddle members are individually actuable to be moved into a horizontal position so as to sequentially release the frozen material to slide towards and over the distal end of the first frame member for collection.

6. A plate freezer apparatus according to claim 5, wherein the frozen material is collected by a harvest conveyor or pallet for further processing.

7. A method of operating the plate freezer apparatus according to claim 1, comprising:
   forming the freezing cavity by moving pairs of the freezing plate members together;
   delivering material to be frozen into the freezing cavity;
   supplying refrigerant material to the freezer plates to cause the material to freeze within the freezing cavity to form a block of frozen material;
   opening the freezing cavity and raising the block of frozen material such that it extends above the upper surface of the freezing plates such that neighbouring block of frozen material as a paddle member located therebetween;
   raising the proximal end of the first frame member to cause the first frame member to tilt towards the distal end;
   applying the sliding motion to the third frame member to cause the blocks of frozen material to break contact with the flooring surface;
   individually activating each of the paddle members to sequentially release the blocks of frozen material such that the blocks of frozen material can slide towards and over the distal end of the first frame member; and
   collecting the blocks of frozen material as they are caused to slide over the distal end of the first frame member.

8. A cleaning system for cleaning the plate freezer apparatus according to claim 1, comprising:

a first pair of spray bars, each of the first pair of spray bars being mounted to an upper surface of the first frame member so as to be located above the upper edge of the freezing plate members to extend along opposing sides of the freezing cavities;

a second pair of spray bars, mounted adjacent the upper edge of freezing plate members so as to extend along opposing sides of the freezing cavities; and a plurality of spray balls, the spray balls being arranged in pairs and mounted to a leg of the movable flooring system so as to be located below the floor of the flooring system such that as the flooring system is raised and lowered within the freezing cavities the pair of spray balls are also raised and lowered within the cavities;

wherein each of the first pair of spray bars, the second pair of spray bars and the pairs of spray balls are connectable to a fluid source to spray fluid therefrom to wash the plate freezer apparatus as the plate freezer apparatus undergoes a dedicated cleaning cycle.

9. A cleaning system according to claim 8, wherein the system further comprises a controller for controlling the operation of the apparatus and first pair of spray bars, second pair of spray bars and pairs of spray balls to facilitate cleaning of the apparatus.

10. A cleaning system according to claim 8, wherein each of the first spray bars and second spray bars have a plurality of holes cut therealong to spray fluid therefrom in a predetermined arc.

11. A cleaning system according to claim 10, wherein the holes are cut in the first and second spray bars by way of a laser cutting process such that the fluid sprayed therefrom is directed to a predetermined area defined by the predetermined arc.

12. A cleaning system according to claim 11, wherein the holes cut in the first spray bars deliver fluid into each of the freezing cavities.

13. A cleaning system according to claim 11, wherein the holes cut in the second spray bars to deliver fluid onto a top surface and respective side surface of each of the plates of the freezer cavities.

14. A cleaning system according to claim 11 wherein the spray balls are configured to deliver a spray of fluid in a substantially 360° arc so as to clean the walls of the plates as the spray balls are raised and lowered within the freezing cavities.

* * * * *